United States Patent [19]

Tanaka

[11] Patent Number: 5,004,530
[45] Date of Patent: Apr. 2, 1991

[54] DISCHARGE MACHINING APPARATUS WITH LIQUID FLOW CONTROL

[75] Inventor: Hidehiko Tanaka, Aichi, Japan

[73] Assignee: Mitsubishi Denki Kabushiki Kaisha, Tokyo, Japan

[21] Appl. No.: 381,927

[22] Filed: Jul. 19, 1989

[30] Foreign Application Priority Data

Jul. 20, 1988 [JP] Japan .................... 63-178980

[51] Int. Cl.⁵ ............ B23H 3/10; B23H 7/36; B23H 9/14
[52] U.S. Cl. ............................ 204/224 M; 219/69.14
[58] Field of Search ............ 204/129.2, 224 M; 219/69.11, 69.14

[56] References Cited

U.S. PATENT DOCUMENTS

| 3,067,358 | 12/1962 | DeMaine | 219/69.14 X |
| 3,435,175 | 3/1969 | Shaffer | 219/69.14 X |

FOREIGN PATENT DOCUMENTS

| 3444607 | 6/1986 | Fed. Rep. of Germany | 219/69.14 |
| 0138546 | 8/1982 | Japan | 219/69.14 |
| 0823050 | 4/1981 | U.S.S.R. | 219/69.14 |

*Primary Examiner*—Donald R. Valentine
*Attorney, Agent, or Firm*—Sughrue, Mion, Zinn, Macpeak and Seas

[57] ABSTRACT

A machining liquid 5 is supplied to a machining zone between a machining electrode 4 and a workpiece 2 in a direction effective to remove material particles to be accumulated around the machining zone. When the liquid pressure drops below a predetermined level due to a breakthrough in the bottom of the workpiece, machining liquid is supplied in a direction up through the breakthrough hole to compensate for a reduction of particle removing effect due to the pressure drop.

5 Claims, 4 Drawing Sheets

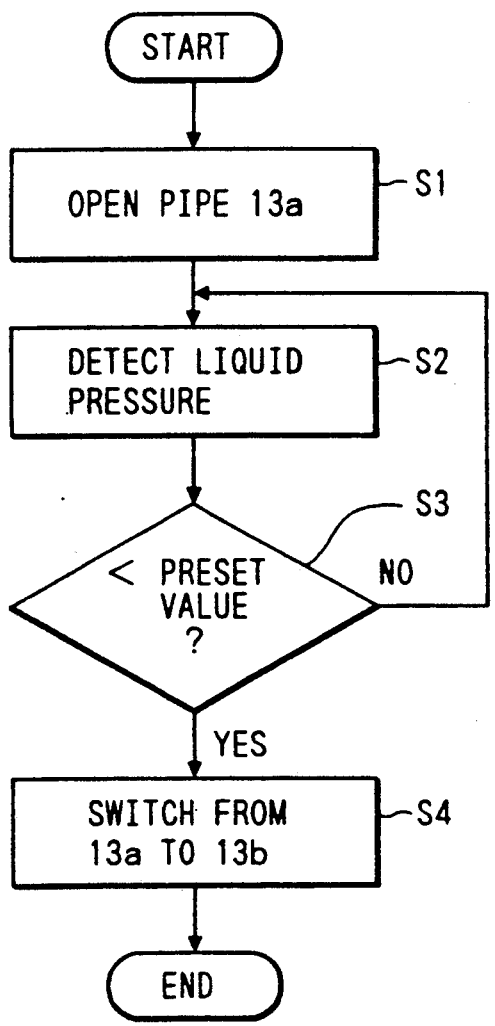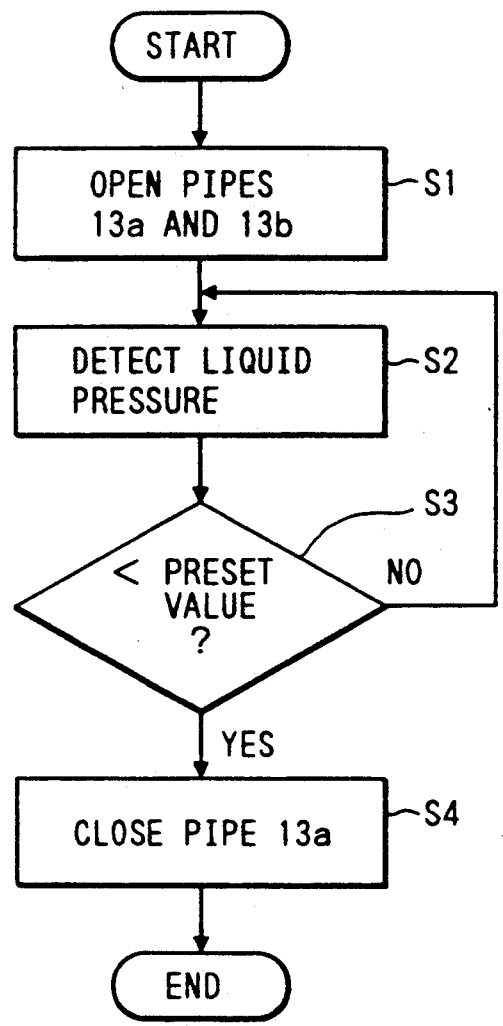

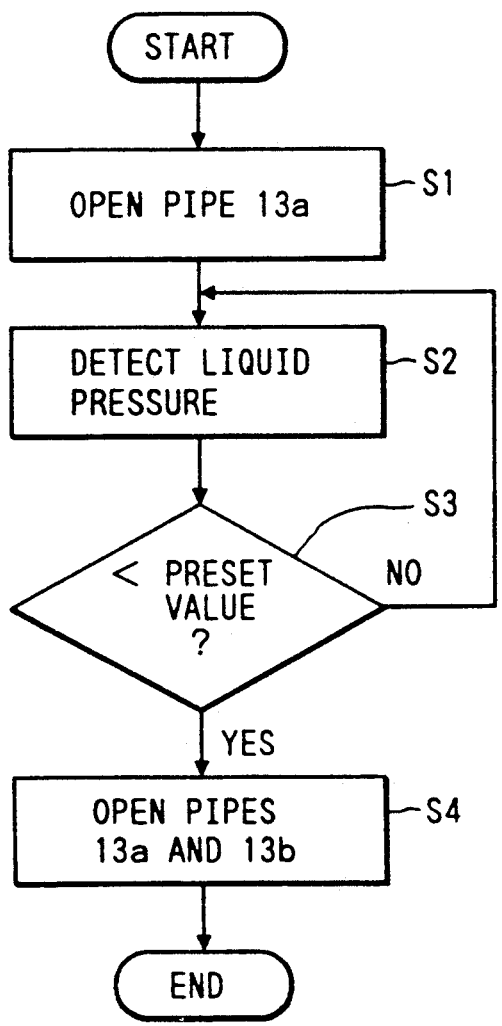

DISCHARGE MACHINING APPARATUS WITH LIQUID FLOW CONTROL

BACKGROUND OF THE INVENTION

This invention relates to a discharge machining apparatus and, particularly, to means for spraying machining liquid to a machining portion thereof.

FIG. 6 shows schematically an example of a conventional discharge machining apparatus and FIG. 7 is an enlarged cross section of a machining portion thereof showing a relation between a workpiece and an electrode in the machining portion. In FIG. 6, the conventional discharge machining apparatus includes a machining tank 1, a machining table 3 disposed on a bottom of the tank 1, a machining electrode 4 and a pump 6 for supplying machining liquid 5 through a pressure regulating valve 7 to the machining electrode 4. A pressure meter 8 is associated with the pressure regulating valve 7. A workpiece 2 is fixedly disposed on the machining table 3.

The machining electrode 4 has a central hollow portion 4a as shown in FIG. 7.

In the conventional discharge machining apparatus constructed as mentioned above, machining liquid 5 supplied under pressure by the supply pump 6 is supplied to the hollow portion 4a of the electrode 4 at a pressure set by the valve 7 and sprayed from an end of the electrode 4.

Material particles 2a sputtered from the workpiece 2 due to discharge current resulting from pulse voltage applied across the workpiece 2 and the electrode 4 are conveyed, with vaporized high temperature machining liquid 5, along an outer periphery of the electrode 4 upwardly and are discharged as illustrated in FIG. 7.

In the conventional discharge machining apparatus applied to, for example, a machining of a through-hole in a workpiece, when a bottom of the workpiece 2 is partially opened by the electrode 4 whose end is approaching an end position of the machining during the machining of the through-hole in the workpiece 2 as shown in FIG. 8, machining liquid 5 may be discharged through this partial opening. Therefore, the pressure of machining liquid 5 which is regulated by the valve 7 is lowered, so that material particles 2a to be discharged externally along the outer periphery of the electrode 4 are accumulated in between the workpiece 2 and the electrode 4. Since a machining speed is lowered by this accumulation of material particles 2a, it is necessary to stop the machining and remove them manually, resulting in difficulties in an automated machining operation.

SUMMARY OF THE INVENTION

An object of the present invention is to provide a discharge machining apparatus which does not require a stoppage of machining operation to remove accumulation of material particles, even if a portion of a bottom of a workpiece is opened during an automatic through-hole machining operation, and is capable of operating fully automatically.

A discharge machining apparatus according to this invention is constructed such that liquid pressure of machining liquid being supplied to the side of an electrode during a machining is detected and, when the pressure is lowered to a value lower than a predetermined value, a switch valve having a pair of outlets connected to a machining electrode and a machining table, respectively, is actuated to close the outlet connected to the electrode and to open the other outlet connected to the machining table mounting a workpiece and having a through-hole to thereby switch a supply direction of machining liquid so that machining liquid is blown up through the through-hole of the machining table.

The machining liquid blown up through the through-hole of the machining table functions to discharge material particles accumulated between the electrode and the workpiece due to a pressure drop caused by a partially opened hole in the bottom of the workpiece.

BRIEF DESCRIPTION OF THE DRAWINGS

FIG. 3 is a flow-chart of the operation of the embodiment in FIG. 1;

FIGS. 4 and 5 are flow-charts of operations of other embodiments of this invention, respectively;

DETAILED DESCRIPTION OF THE PREFERRED EMBODIMENT

Figure 1:
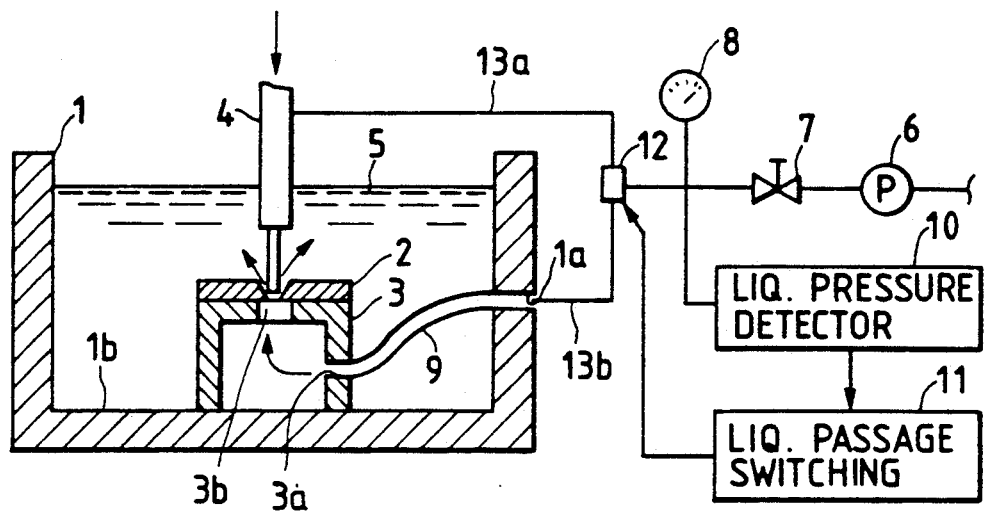
FIG. 1 shows a construction of a discharge machining apparatus according to an embodiment of this invention, schematically.
Figure 6:
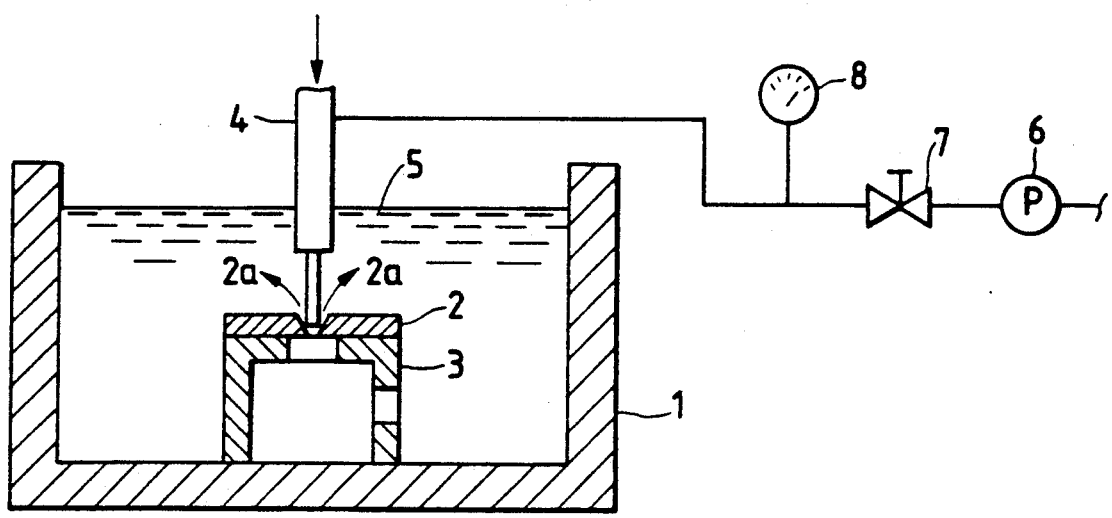
FIG. 6 shows a construction of a conventional discharge machining apparatus, schematically.
Figure 7:
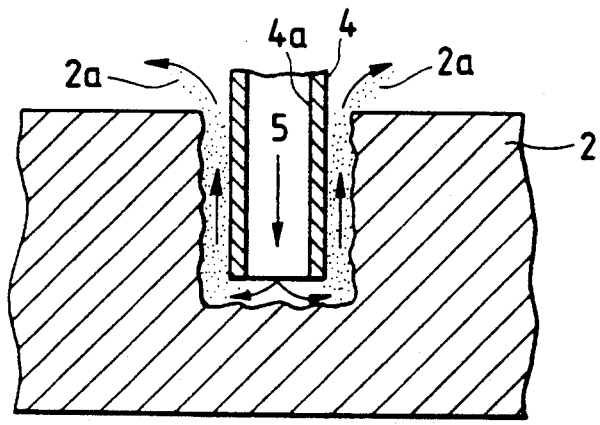
FIGS. 7 and 8 are cross-sections of a machining portion for explaining the of an operation of the conventional apparatus shown in FIG. 6.
Figure 8:
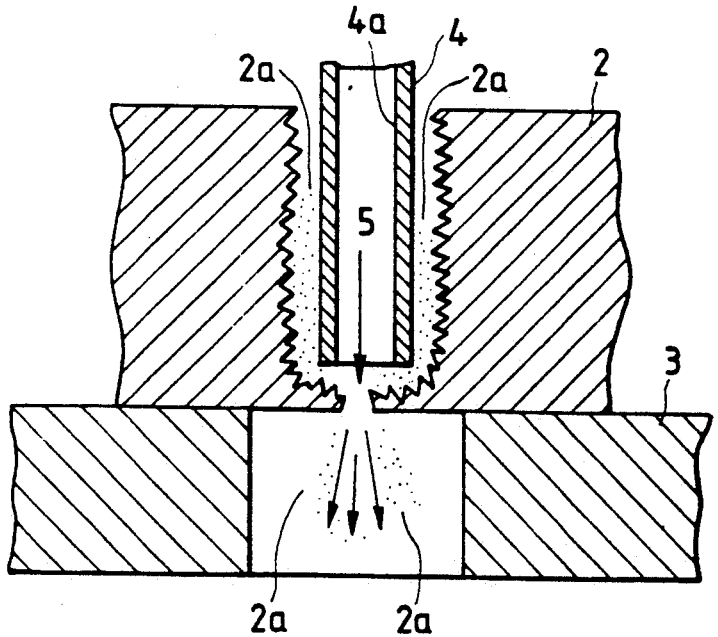

FIG. 1 shows schematically a construction of a discharge machining apparatus according to an embodiment of this invention, in which reference numerals 1–8 depict same or corresponding portions as those shown in FIG. 6 showing the conventional construction and therefore details thereof are omitted to avoid duplication. One thing which is different is that the bottom 1b of the machining tank 1 is in intimate contact with the bottom portion of the machining table 3 to provide a liquid-tight contact.

A pipe 9 connects a hole 1a provided in a side wall of the machining tank 1 and a hole 3a formed in a side wall of the machining table 3. A machining liquid pressure detection device 10 is provided to detect machining liquid pressure by means of a machining liquid pressure meter 8 associated therewith. A machining liquid passage switching device 11 responds to an output of the machining liquid pressure detection device 10 and actuates a three-way electromagnetic valve 12 to switch the passage of machining liquid 5 as described later.

A pipe 13a communicates one of the two outlets of the three-way electromagnetic valve 12 with the through-hole 4a of the machining electrode 4 to allow a supply of machining liquid 5 to the latter only when the one outlet of the three-way valve 12 is opened.

A pipe 13b provides a liquid communication between the other outlet of the three-way electromagnetic valve 12 and the pipe 9 only when the other outlet of the valve 12 is opened.

In the discharge machining apparatus constructed as above, machining liquid 5 is normally supplied under pressure by the machining liquid supply pump 6 through the pipe 13a to the electrode 4. The pressure value of the liquid is determined by the valve 7 and the machining proceeds while material particles 2a resulting from the discharge machining are discharged externally along an outer periphery of the electrode 4.

When a bottom portion of a workpiece 2 is opened partially with a progress of machining, the machining liquid pressure in the pipe 13a drops abruptly. This decrease of liquid pressure is detected by the machining liquid pressure detection device 10 upon which the passage switching device 11 provides an instruction to the three-way electromagnetic valve 12 to actuate the latter to close the one outlet thereof and to open the other outlet thereof.

Figure 2:
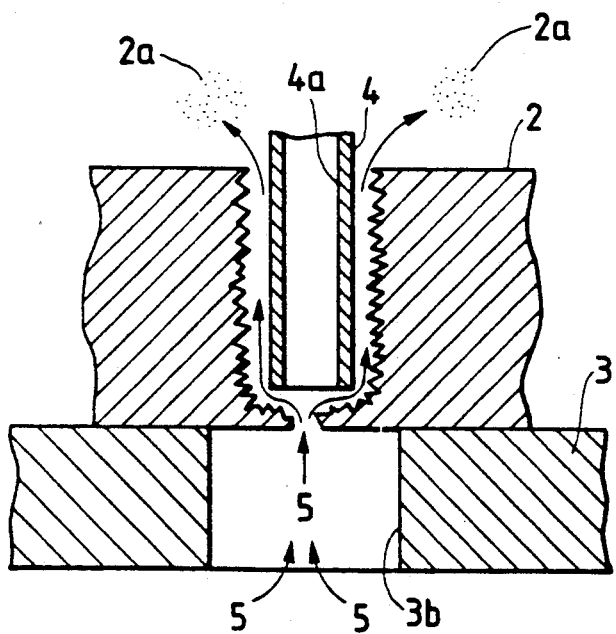
FIG. 2 is an enlarged cross section of a machining portion of the discharge machining apparatus shown in FIG. 1 for explaining the of an operation thereof.

Thus, machining liquid 5 is supplied through the pipe 13b, the pipe 9 to an interior of the machining table 3 and then, as shown in FIG. 2, through the hole 3b of the machining table 3 and the partially opened hole of the workpiece 2 into the space between the workpiece 2 and the electrode 4, so that material particles 2a are blown up and discharged.

This operation will be described in more detail with reference to a flow-chart shown in FIG. 3.

When machining liquid 5 supplied by the machining liquid supply pump 6 is at a preset pressure, the one outlet of the three-way electromagnetic valve 12 connected to the pipe 13a is opened to supply machining liquid 5 into the electrode 4 (step S1). The machining liquid pressure detection device 10 detects the machining liquid pressure (step S2) and, when a detected value is lower than the preset value (step S3), the three-way electromagnetic valve 12 is actuated by an instruction from the machining liquid passage switching device 11 to open the other outlet connected to the pipe 13b and close the one outlet connected to the pipe 13a (step S4) so that machining liquid 5 is supplied through the pipe 13b, the pipe 9 and the inside of the machining table 3 to the hole 3b formed in its upper wall.

Although, in the above embodiment, the pipe 13a communicating with the interior of the electrode 4 and the pipe 13b communicating with the interior of the machining table 3 have been described as being switched alternately by the three-way electromagnetic valve 12, it may be possible to operate the apparatus according to either of the flow-charts in FIGS. 4 and 5, in which case, instead of the three-way valve 12, a valve which functions, in addition to the alternative opening of the pipes 13a and 13b, to hold them open simultaneously according to demand, may be used.

In the step S1 in FIG. 4, the pipes 13a and 13b are opened simultaneously to supply machining liquid 5. Steps S2 and S3 are the same as those in FIG. 3 and, when machining liquid pressure drops to a value lower than the preset value, the operation is shifted to the step S4 to close only the pipe 13a to thereby supply machining liquid 5 through the pipe 13b and the pipe 9 to the hole 3b.

Alternatively, in FIG. 5, only the pipe 13a is opened to supply machining liquid 5 in the step S1. The steps S2 and S3 are the same as those in FIG. 3 or 4, and, when machining liquid pressure becomes lower than the preset value, the operation is shifted to the step S4 to open both of the pipes 13a and 13b to thereby supply machining liquid 5 to the pipes 13a and 13b.

Further, while in the above embodiments, the reduction of liquid pressure is detected by the machining liquid pressure detection device 10, it is possible, with the same effect as that of the above embodiments, to constitute the apparatus such that a liquid pressure value at which the machining liquid passage is to be switched is preliminarily stored in a memory means and a switching of the machining liquid passage is performed by actuating a valve when the actual liquid pressure is changed.

As described hereinbefore, according to this invention, it is constituted such that a variation of machining liquid pressure occurred at a time when the electrode partially penetrates the workpiece is detected upon which the machining liquid passage is switched to switch a jetting direction of machining liquid toward a machining portion. Therefore, there is no accumulation of machining particles during machining and the machining condition can be always maintained, resulting in a reliable, automated machining.

What is claimed is:

1. A discharge machining apparatus, comprising: a machining tank (1), a machining table (3) disposed in said tank and having an aperture (3b) in an upper surface thereof, a hollow tipped machining electrode (4) adapted to machine a workpiece (2) disposed over said aperture on said machining table by means of electric discharge between said electrode and said workpiece, a machining liquid supply system for normally supplying machining liquid to a machining zone between said electrode tip and said workpiece through a first machining liquid supply passage extending from pump means (6) down through said hollow electrode tip, through said machining zone, and up through a space defined between an outer peripheral surface of said machining electrode and said workpiece to flush away particles sputtered from the workpiece, means for detecting a pressure drop in said first machining liquid supply passage to a value smaller than a predetermined value caused by a breakthrough in a bottom of the workpiece over the aperture, and means responsive to an output of said detecting means to supply machining liquid through a second machining liquid supply passage extending from said pump means up through the machining table aperture and workpiece breakthrough, through the machining zone, and up through said space between the outer peripheral surface of the electrode and the workpiece to continue the flushing away of said particles.

2. The apparatus as claimed in claim 1, wherein said responsive means comprises a three-way valve having an inlet connected to said pump means, a first outlet adapted to be opened normally for supplying said first machining liquid supply passage and a second outlet adapted to be opened for supplying said second machining liquid supply passage.

3. The apparatus as claimed in claim 1, wherein said responsive means comprises valve means for making both said first and second machining liquid supply passages operative normally and, upon an output of said detecting means, for making only said second machining liquid supply passage operative.

4. The apparatus as claimed in claim 1, wherein said responsive means comprises valve means for making said first machining liquid supply passage operative normally and, upon an output of said detecting means, for also making said second machining liquid supply passage operative.

5. The apparatus as claimed in claim 1, wherein said machining table comprises a box-like structure having solid side walls defining, in cooperation with a bottom of the machining tank, a sealed enclosure, and wherein said second machining liquid supply passage extends through an aperture in a side wall of said table.

* * * * *